United States Patent [19]

Tanaka et al.

[11] Patent Number: 5,347,457
[45] Date of Patent: Sep. 13, 1994

[54] METHOD AND APPARATUS FOR CONTROLLING VEHICLE SUSPENSION SUCH THAT SUSPENSION CHARACTERISTICS ARE CHANGED AT A POINT IN TIME WHEN A VEHICLE WHEEL REACHES A ROAD SURFACE IRREGULARITY DETECTED IN FRONT OF THE VEHICLE

[75] Inventors: Tadao Tanaka; Takao Morita; Akihiko Togashi; Naohiro Kishimoto; Hiroaki Yoshida, all of Aichi, Japan

[73] Assignee: Mitsubishi Jidosha Kogyo Kabushiki Kaisha, Tokyo, Japan

[21] Appl. No.: 760,160

[22] Filed: Sep. 16, 1991

[30] Foreign Application Priority Data

Sep. 18, 1990 [JP] Japan ................. 2-248418

[51] Int. Cl.⁵ .................. B60G 17/00; B60G 17/08
[52] U.S. Cl. .................. 364/424.05; 280/707
[58] Field of Search ............. 364/424.05, 561, 569; 280/707, 840, 688

[56] References Cited

U.S. PATENT DOCUMENTS

| | | | |
|---|---|---|---|
| 4,600,215 | 7/1986 | Kuroki et al. | 280/707 |
| 4,630,226 | 12/1986 | Tanaka | 364/561 |
| 4,781,465 | 11/1988 | Demachi et al. | 356/371 |
| 4,827,416 | 5/1989 | Kawagoe et al. | 364/424.05 |
| 4,903,209 | 2/1990 | Kaneko | 364/424.05 |
| 4,905,152 | 2/1990 | Kawabata | 364/424.05 |
| 4,953,890 | 9/1990 | Kamimura | 280/707 |
| 4,975,849 | 12/1990 | Ema | 364/424.05 |
| 4,984,820 | 1/1991 | Uchiyama et al. | 280/707 |
| 5,083,275 | 1/1991 | Kawagoe et al. | 364/424.05 |
| 5,103,397 | 4/1992 | Ikemoto et al. | 364/424.05 |

Primary Examiner—Thomas G. Black
Assistant Examiner—Leigh Marie Garbowski

[57] ABSTRACT

A vehicular suspension control apparatus includes a selector valve for changing at least one of spring rigidity or damper rigidity of a suspension which is installed between a wheel and a body of a vehicle and extensibly and retractably supports the vehicle body on the wheel, a forward road surface sensor attached to the vehicle body and adapted to detect an irregularity of a road surface located in front of the vehicle body at a predetermined distance from the mounting position of the sensor when the vehicle body is in a predetermined attitude, a vehicle speed sensor for detecting a vehicle speed, and a controller for calculating a point of time when the wheel reaches the irregularity of the road surface, in accordance with the vehicle speed detected by the vehicle speed sensor, when the irregularity of the road surface is detected by the forward road surface sensor, and delivering a command signal for lowering at least one of the spring rigidity and the damper rigidity of the suspension to the selector valve by not later than the calculated time point.

26 Claims, 8 Drawing Sheets

METHOD AND APPARATUS FOR CONTROLLING VEHICLE SUSPENSION SUCH THAT SUSPENSION CHARACTERISTICS ARE CHANGED AT A POINT IN TIME WHEN A VEHICLE WHEEL REACHES A ROAD SURFACE IRREGULARITY DETECTED IN FRONT OF THE VEHICLE

BACKGROUND OF THE INVENTION

1. Field of the Invention

The present invention relates to a vehicular suspension control method and apparatus used in a vehicle, such as an automobile, and adapted to detect the condition of a road surface in front of the vehicle and properly control the operation of a suspension.

2. Description of the Related Art

An optical forward road surface sensor described in Published Unexamined Japanese Patent Application No. 60-142208 (U.S. Pat. No. 4,781,465; G.B. Pat. No. 2,151,872; DE. Pat. No. 3,447,015; FR. Pat. No. 2,557,288) and an ultrasonic forward road surface sensor described in Published Unexamined Japanese Patent Application No. 62-131813 are conventionally known as apparatuses for detecting irregularities of a road surface in front of a vehicle. In these prior art examples, it is proposed that the operation of a suspension be controlled depending on the conditions of the road surface in front of the vehicle detected by the forward road surface sensor.

In the former patent application, there is no description of a specific example of the suspension operation control. Disclosed in the latter patent application, on the other hand, is a technique for controlling the damper rigidity of the suspension, more specifically, a vibration damping force which is produced by a shock absorber, when a wheel of the vehicle reaches an irregularity which is detected on the road surface in front of the vehicle, referring to the vehicle speed. According to this technique, the damper rigidity of the suspension is lowered when the irregularity of the road surface in front of the vehicle is detected by the forward road surface sensor. Thus, impulsive vibrations produced in the vehicle body is effectively damped when the wheel gets over irregularities of the road surface, e.g., protuberances or joints in a paved road.

In the latter prior art example described above, the forward road surface sensor is mounted on the front portion of the vehicle at a predetermined angle of incidence, and is used to detect the irregularity of the road surface located in front of the vehicle at a predetermined distance therefrom when the vehicle body is in a predetermined attitude, e.g., when the vehicle is at a stop. The aforementioned control is effected in accordance with this predetermined distance. Since the forward road surface sensor is low-priced, the cost of the whole apparatus can be reduced with ease. When the vehicle actually runs, however, its body undergoes a change of attitude attributable to pitching or nose dive, so that the actual distance between the vehicle and the irregularity of the road surface detected by the forward road surface sensor frequently changes. Thus, a difference is caused between this actual distance and the predetermined distance. In this prior art example, therefore, the damper rigidity of the suspension is not controlled with correct timing when the wheel gets over the irregularity of the road surface.

According to the former prior art example, moreover, a sensing device is used to measure distances from the vehicle to three positions in front of the vehicle, thereby detecting the distances between the vehicle and irregularities of the road surface, as well as the irregularities themselves. Although the use of this device solves the aforesaid problem, it makes the whole apparatus more complicated in construction, more expensive, and therefore, hardly practical.

SUMMARY OF THE INVENTION

The object of the present invention is to provide a vehicular suspension control method and apparatus capable of controlling the spring rigidity and the damper rigidity of a suspension with correct timing, even though the body of a vehicle undergoes a change of attitude, such as pitching, nose dive, etc., despite the use of a forward road surface sensor for detecting the conditions of a road surface located in front of the vehicle at a predetermined distance therefrom.

In order to achieve the above object, a vehicular suspension control method and apparatus according to the present invention comprises suspension characteristic changing means for changing at least one of spring rigidity and damper rigidity of a suspension which is provided between a wheel and a body of a vehicle and extensibly and retractably supports the vehicle body on the wheel, a forward road surface sensor attached to the vehicle body and adapted to detect an irregularity of a road surface located in front of the vehicle body at a predetermined distance from the mounting position of the sensor when the vehicle body is in a predetermined attitude, a vehicle speed sensor for detecting a vehicle speed, control means for calculating a point of time when the wheel reaches the irregularity of the road surface, in accordance with the vehicle speed detected by the vehicle speed sensor, when the irregularity of the road surface is detected by the forward road surface sensor, and delivering a command signal for lowering at least one of the spring rigidity and the damper rigidity of the suspension to the suspension characteristic changing means not later than the calculated time point, and vehicle body attitude sensing means for detecting a vehicle height and an inclination of the vehicle body, and the control means corrects the predetermined distance in accordance with the vehicle height and the vehicle body inclination detected by the vehicle body attitude sensing means, and calculates the time point in accordance with the corrected predetermined distance and the vehicle speed detected by the vehicle speed sensor.

According to the present invention, the control means corrects the predetermined distance for the forward road surface sensor, which detects the irregularity of the road surface located in front of the vehicle body at the predetermined distance from the mounting position of the sensor when the vehicle body is in the predetermined attitude, in accordance with the vehicle height and the vehicle body inclination detected by the vehicle body attitude sensing means for detecting the change of attitude of the vehicle. Also, the control means calculates the point of time when the wheel reaches the irregularity of the road surface, in accordance with the corrected predetermined distance and the vehicle speed detected by the vehicle speed sensor. Even though the vehicle body, having the forward road surface sensor thereon, undergoes a change of attitude, such as pitching or nose dive, therefore, the point of time when the wheel reaches the irregularity of the road surface is accurately calculated without regard to the measure of the attitude change of the vehicle body. Accordingly, the spring rigidity and the damper rigidity of the suspension is always changed with correct timing, so that the vehicle can provide improved comfortableness to ride in as it gets over irregularities of the road surface or runs on Joints in a paved road.

Since the forward road surface sensor is used to detect the irregularity of the road surface located in front of the vehicle at the predetermined distance therefrom, moreover, the sensor itself is low-priced, so that the apparatus can be easily put to practical use.

Preferably, according to the present invention, the control means executes the correction of the predetermined distance when any of the vehicle heights detected by the vehicle height sensing means is deviated from a range defined by predetermined upper and lower limit values. Thus, a useless calculation ran be avoided when the change of attitude of the vehicle body is so small that the correction of the predetermined distance is not effective.

Preferably, moreover, control means corrects the predetermined distance by calculating the above-the-road height and an incidence angle of the forward road surface sensor in accordance with the vehicle heights detected by the vehicle height sensing means. Thus, the actual distance between the vehicle and the irregularity of the road surface detected by the forward road surface sensor is obtained with high accuracy, so that high-accuracy suspension control can be enjoyed.

Preferably, furthermore, the suspension includes a hydraulic actuator whose supporting force to support the vehicle body on the wheel is adjustable, an accumulator connected to the hydraulic actuator, and an oil passage connecting the hydraulic actuator with the accumulator, and the suspension characteristic changing means includes a variable selector valve arranged in the middle of the oil passage, for variably controlling the opening area of the oil passage. Thus, the operation of the suspension is changed in an instant with high responsiveness to impulsive vibration input of high frequency which is produced when the wheel gets over protuberances on the road surface or joints in a paved road.

The above and other objects, features, and advantages of the invention will be more apparent from the ensuing detailed description taken in connection with the accompanying drawings.

DETAILED DESCRIPTION OF THE PREFERRED EMBODIMENTS

Figure 1:
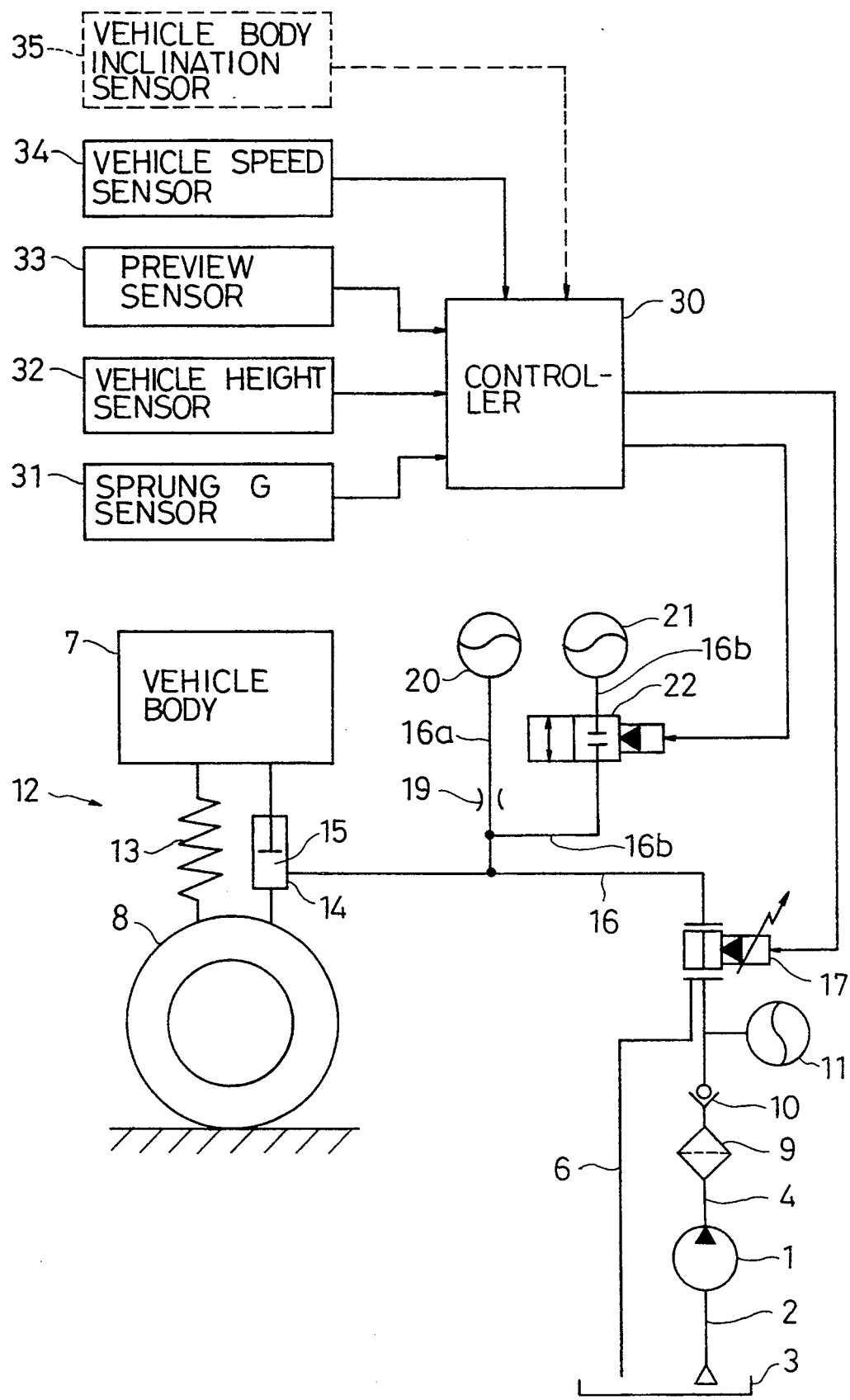
FIG. 1 is a block diagram schematically showing a construction of a vehicular active suspension control apparatus according to the present invention.

FIG. 1 shows a vehicular suspension control apparatus according to an embodiment of the present invention, which is applied to a so-called active suspension apparatus of an automobile. Referring to FIG. 1, there is shown a suspension 12 which is attached to each of wheels 8 and installed between the wheel 8 and a vehicle body 7, and extensibly and retractably supports the vehicle body 7 on the wheel 8. The illustrated suspension 12 is representing one suspension for one of the wheels 8. A suspension spring 13 of the suspension 12 and a single-acting hydraulic actuator 14 are arranged in parallel between the vehicle body 7 and their corresponding wheel 8.

A control valve 17 for controlling a supporting force on the hydraulic actuator 14 is installed between an oil passage 16, which communicates with a cylinder chamber 15 of the actuator 14, and supply and discharge oil passages 4 and 6, which will be mentioned later. One end of a first branch passage 16a is connected to the middle portion of the oil passage 16, and a first accumulator 20 is connected to the other end of the passage 16a. A gas is sealed in the first accumulator 20, and its compressibility provides the so-called gas spring effect. An orifice 19 is arranged in the middle of the first branch passage 16a. The orifice 19 serves to regulate the amount of hydraulic oil flow between the first accumulator 20 and the cylinder chamber 15 of the hydraulic actuator 14, thereby producing a vibration damping force.

In parallel with the first branch passage 16a, a second branch passage 16b is connected to the oil passage 16. Arranged in the second branch passage 16b is a selector valve 22 which constitutes suspension characteristic changing means. A second accumulator 21 is connected to the passage 16b. The selector valve 22 is closed (in the state of FIG. 1) when it is not energized, and in this state, the second accumulator 21 is cut off from the oil passage 16. When the valve 22 is energized and opened, the second accumulator 21 communicates with the oil passage 16 by means of the valve 22. Thus, the total capacity of the accumulator which communicates with the hydraulic actuator 14 and the total opening area of the oil passage, which connects these elements, is simultaneously changed in two stages by selectively operating the selector valve 22, as described in detail later. In this manner, the spring rigidity, that is, the spring constant of the suspension 12 and the damper rigidity, that is, the vibration damping force thereof are changed correspondingly in two stages.

Figure 2:
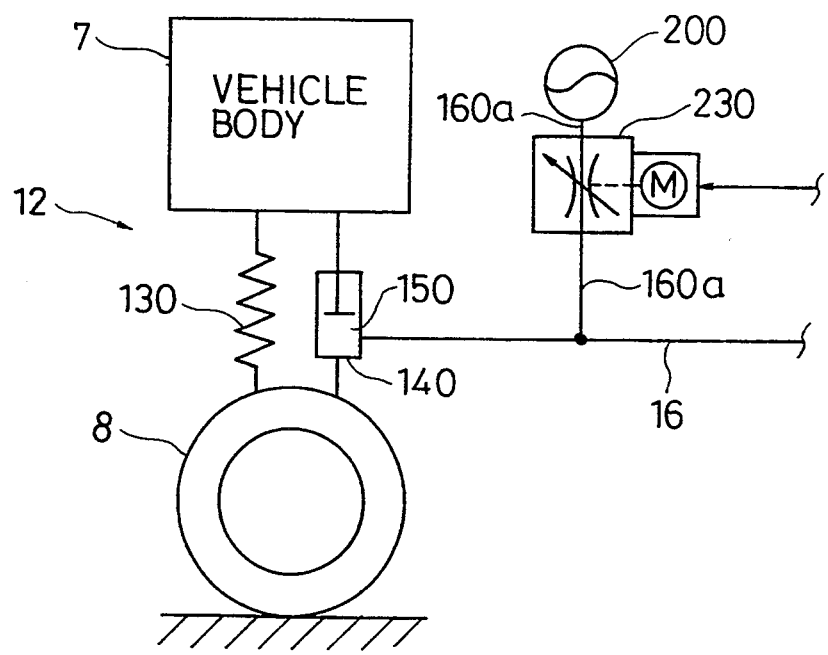
FIG. 2 is a schematic view showing a first modification of suspension characteristic changing means.

FIG. 2 shows a first modification of the suspension characteristic changing means.

In this modification, the suspension 12 comprises a suspension spring 130 and a hydraulic actuator 140, which support the vehicle body 7 on each wheel 8, an accumulator 200 connected to the actuator 140, and an oil passage 160a which connects the actuator 140 with the accumulator 200. Arranged in the middle of the oil passage 160a is a variable selector valve 230 which variably controls the opening area of the passage 160a in a multitude of stages, and constitutes suspension characteristic changing means. In this case, the damper rigidity, that is, the vibration damping force of the suspension 12 is changed in a multitude of stages by controlling the variable selector valve 220.

Figure 3:
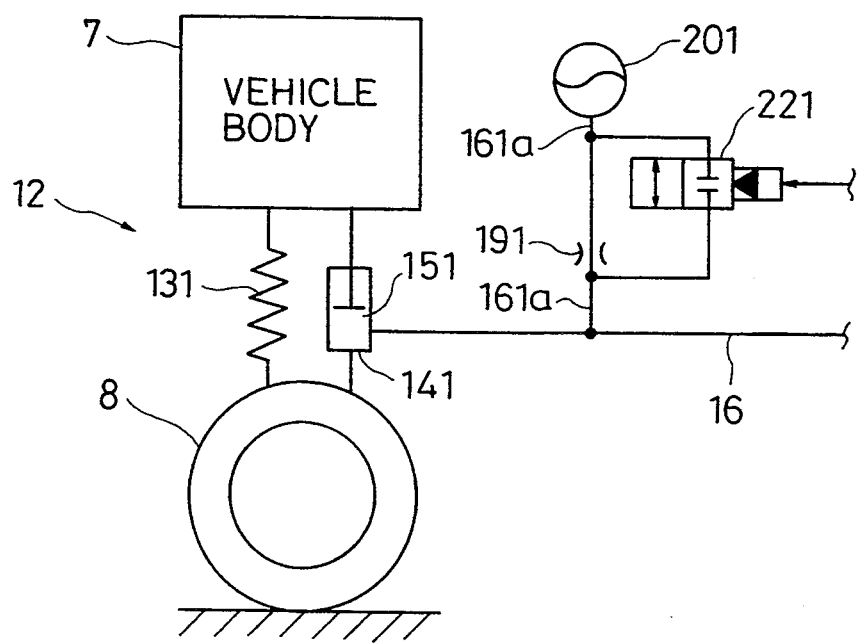
FIG. 3 is a schematic view showing a second modification of the suspension characteristic changing means.

FIG. 3 shows a second modification of the suspension characteristic changing means.

In this modification, the suspension 12 comprises a suspension spring 131 and a hydraulic actuator 141, which support the vehicle body 7 on each wheel 8, an accumulator 201 connected to the actuator 141, and an oil passage 161a which connects the actuator 141 with the accumulator 201. Arranged in the middle of the oil passage 161a are an orifice 191 and a selector valve 221 which is shifted between two positions, open and closed, and constitutes suspension characteristic changing means. The orifice 191 and the valve 221 are connected in parallel with each other. In this case, the damper rigidity, that is, the vibration damping force of the suspension 12 is changed in two stages by controlling the selector valve 221.

Figure 4:
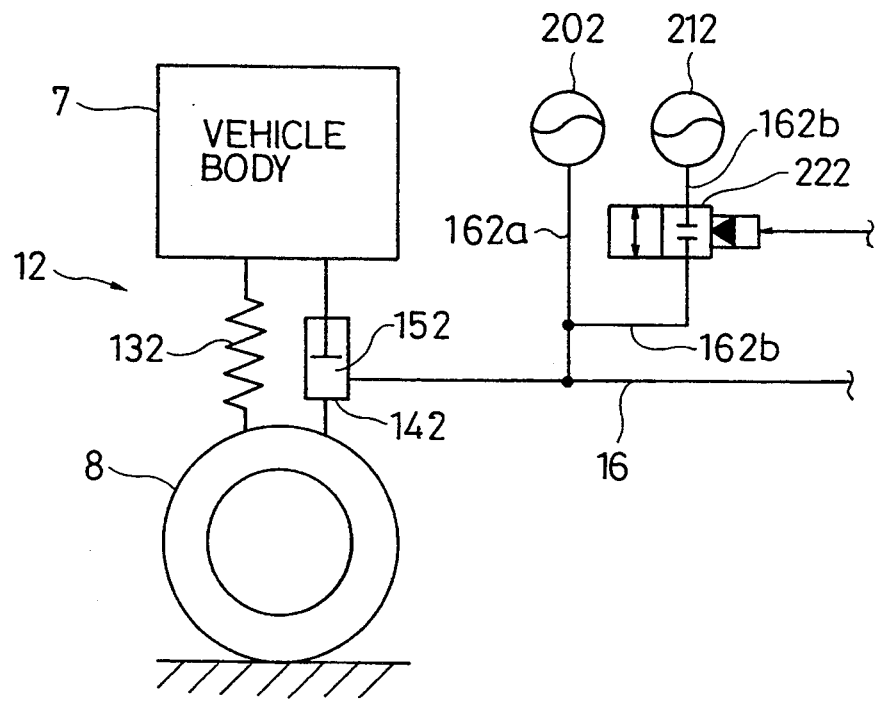
FIG. 4 is a schematic view showing a third modification of the suspension characteristic changing means.

FIG. 4 shows a third modification of the suspension characteristic changing means.

In this modification, the suspension 12 comprises a suspension spring 132 and a hydraulic actuator 142, which support the vehicle body 7 on each wheel 8, first and second accumulators 202 and 212 connected in parallel with each other and to the actuator 142, and first and second oil passage 162a and 162b which connect the actuator 142 with the first and second accumulators 202 and 212, respectively. Arranged in the second oil passage 162b is a selector valve 222 which is shifted between two positions, open and closed, and constitutes suspension characteristic changing means. In this case, the spring rigidity, that is, the spring constant and the damper rigidity, that is, the vibration damping force of the suspension 12 are changed in two stages each by controlling the selector valve 222.

Referring now to FIG. 1, the other end of the supply oil passage 4 is connected to the discharge side of an oil pump 1. The suction side of the pump 1 communicates with the inside of a reservoir 3 by means of a oil passage 2. When the oil pump 1 is operated, therefore, the hydraulic oil stored in the reservoir 3 is discharged toward the supply oil passage 4. An oil filter 9, a check valve 10, and an accumulator 11 for accumulating line pressure are arranged in the passage 4, in the order named from the side of the oil pump 1. The check valve 10 allows the hydraulic oil to flow only from the pump 1 side toward the suspension 12. With use of this valve 10, the hydraulic oil is stored at high pressure in the accumulator 11.

The control valve 17 is of a type such that its opening is changed in proportion to the value of an electric current supplied thereto. Based on this valve opening, the valve 17 controls the amount of oil flow from the supply oil passage 4 toward the discharge oil passage 6, thereby regulating the supporting force acting on the hydraulic actuator 14. The control valve 17 is designed so that if the value of the current supplied thereto is larger, the supporting force produced by the hydraulic actuator 14 is increased in proportion. The hydraulic oil discharged from the control valve 17 toward the discharge oil passage 6 is returned to the reservoir 3.

The control valve 17 and the selector valve 22 are connected electrically to the output side of a controller 30, which constitutes oil pressure control means. The operation of the valve 17 is controlled by a command signal from the controller 30. Various sensors for controlling the suspension 12 are connected to the input side of the controller 30. Among these sensors, a sprung G sensor 31, which is provided for each wheel, is used to detect a vertical acceleration acting on the vehicle body. A vehicle height sensor 32, which is provided for each wheel, serves both as vehicle attitude sensing means and as vehicle height sensing means for detecting the vehicle height at the location of each wheel. A preview sensor 33 constitutes a forward road surface sensor for detecting irregularities of a road surface in front of the vehicle. A vehicle speed sensor 34 is used to detect the running speed of the vehicle.

An ultrasonic sensor is used as the preview sensor 33, for example. The sensor 33 detects the irregularities of the road surface by utilizing reflected waves produced when an ultrasonic wave delivered from the sensor 33 itself is reflected by the irregularities. The sensor 33 is mounted on the front portion of the vehicle body so that it is directed forward and diagonally downward. As mentioned later, moreover, the sensor 33 detects an irregularity of the road surface located in front of the vehicle at a predetermined distance $L_0$ from the mounting position thereof when the vehicle body is in a predetermined attitude (see FIG. 5).

The following is a description of the operation of the suspension 12 in which is incorporated the vehicular suspension control apparatus according to the embodiment shown in FIG. 1.

First, an electric current of a required magnitude is supplied by the controller 30 in accordance with output signals from the sprung G sensor 31 and the like, and the hydraulic oil pressure supplied to the hydraulic actuator 14 is subjected to PID control. This oil pressure gives the hydraulic actuator 14 the supporting force to support the suspension 12.

When the vehicle runs on a smooth road without any irregularities on its surface, the selector valve 22 is closed in response to a command signal from the controller 30, and the hydraulic actuator 14 is cut off from the second accumulator 21. Accordingly, a vibration with a relatively high frequency which, transmitted from the road surface to the vehicle body, cannot be followed up by the control valve 17 is absorbed and damped by the joint action of the orifice 19 and the first accumulator 20.

Since the opening area of the orifice 19 is smaller than those of the oil passage 16 and the first branch passage 16a, the orifice 19 produces a strong vibration damping force. When control valve 17 is actuated, moreover, the amount of hydraulic oil flowing into the first accumulator 20 through the orifice 19 is regulated so as to restrain the responsiveness of the hydraulic actuator 14 from lowering.

On the above condition, the spring rigidity of the suspension 12 is controlled by the mechanical spring force of the suspension spring 13 and the gas spring force of the first accumulator 20, which is controlled by the control valve 17.

Referring now to FIGS. 6 to 12, the control of the selector valve 22 by means of the controller 30, which is executed when the preview sensor 33 detects the irregularities. e.g., protuberances, on the road surface, will be described.

Figure 6:
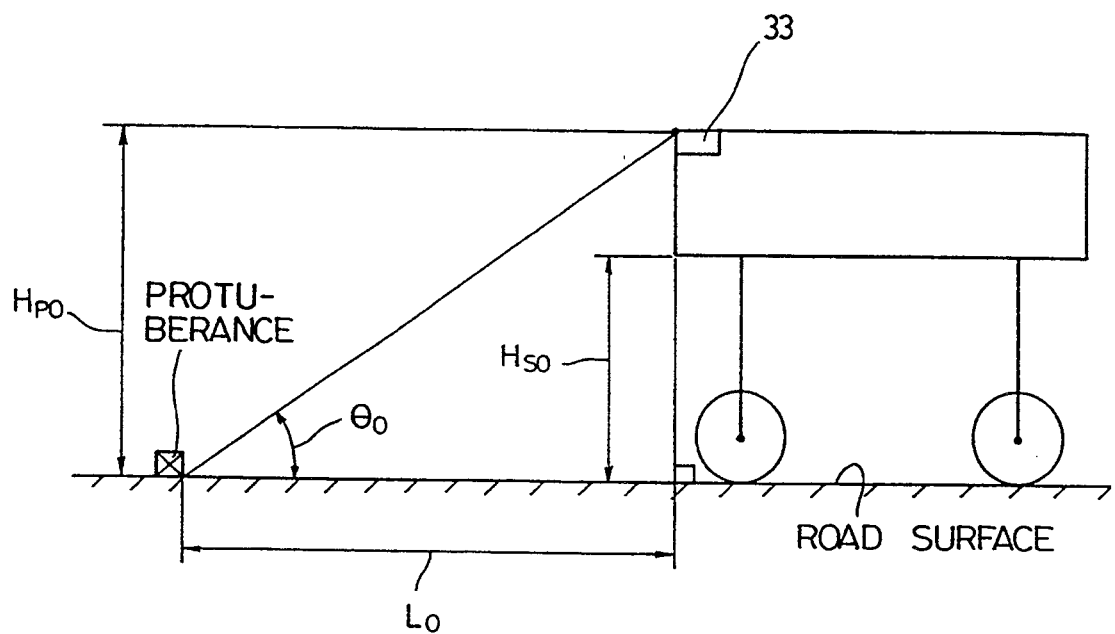
FIG. 6 is a schematic view illustrating the positional relationship between the protuberance and the preview sensor obtained when the body of a vehicle is in a predetermined attitude.

Let it be supposed that the above-the-road height of the preview sensor 33 obtained when the vehicle height at the location of each wheel is at a predetermined value $H_{SO}$ is $H_{PO}$, the distance (hereinafter referred to as protuberance detection distance) from the point of intersection of the road surface and a perpendicular line thereon from the sensor 33 to the leading edge portion of a protuberance detected by the sensor 33 is $L_O$ (predetermined distance), and the angle (hereinafter referred to as incidence angle) formed between the road surface and the line of incidence of the ultrasonic wave from the sensor 33 is $\theta_O$, as shown in FIG. 6.

The above condition is defined as the vehicle body 7 in its predetermined attitude.

In general, when the vehicle is running, the vehicle height at the location of each wheel is deviated from the predetermined vehicle height value $H_{SO}$, and the vehicle body 7 is subject to a forward or backward inclination attributable to the so-called pitching or nose dive.

Figure 7:
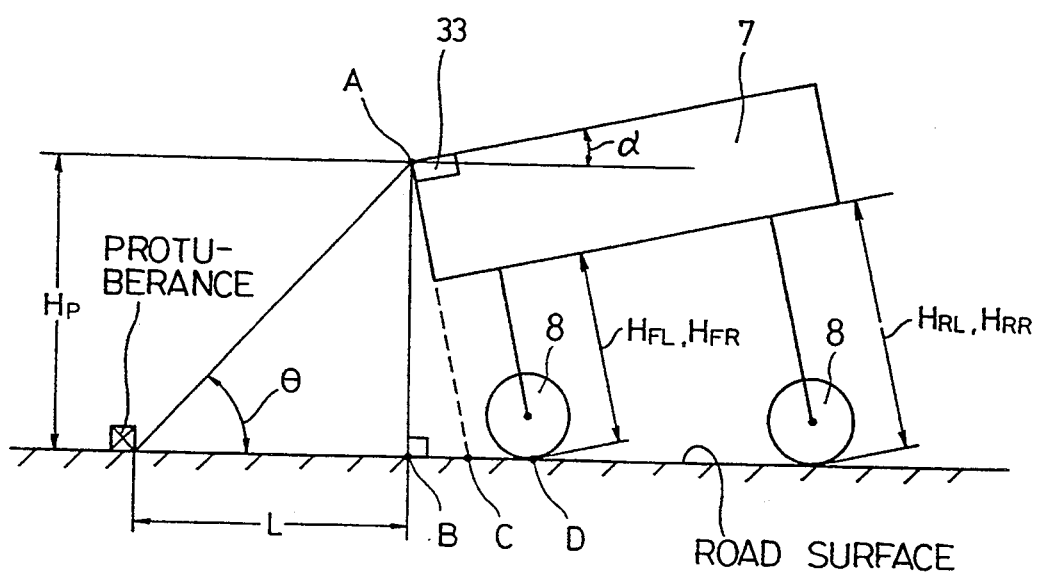
FIG. 7 is a schematic view illustrating the positional relationship between the protuberance and the preview sensor obtained when the vehicle is running.
Figure 8:
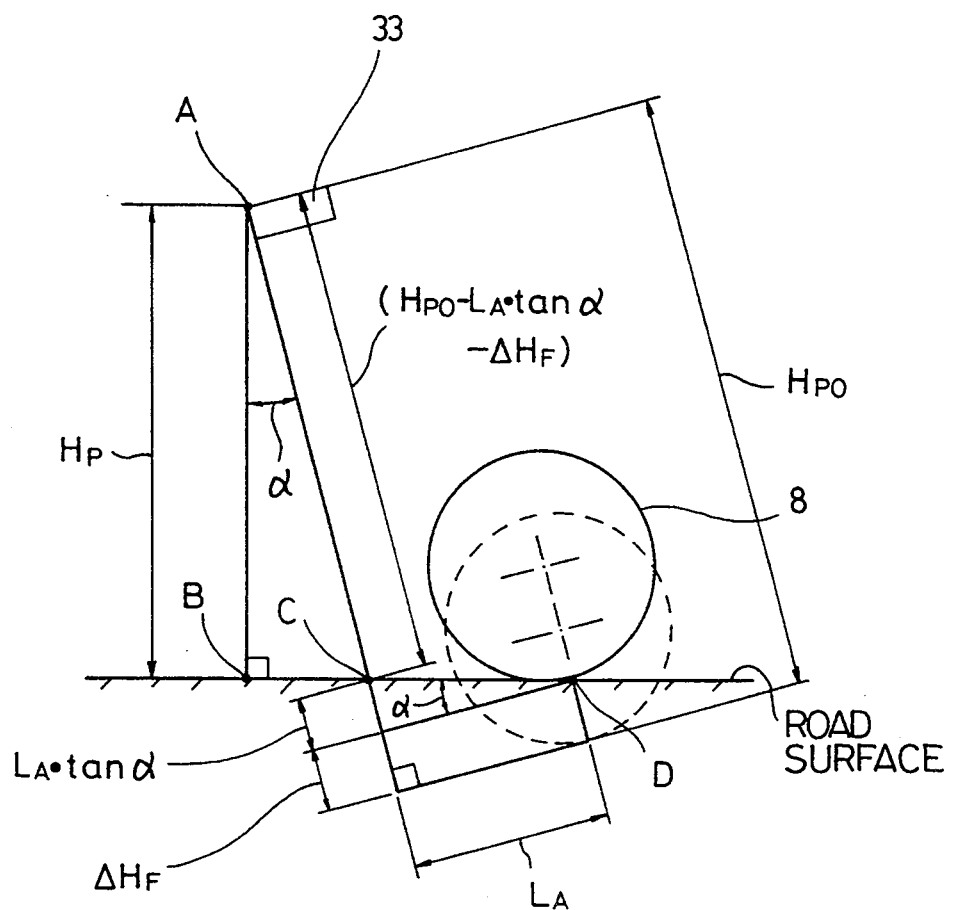
FIG. 8 is a schematic view illustrating the details of the positional relationships between points A, B, C and D shown in FIG. 7.

FIGS. 7 and 8 show a case where vehicle height values at left and right front wheel locations are changed to $H_{FL}$ and $H_{FR}$, respectively, vehicle height values at left and right rear wheel locations are changed to $H_{RL}$ and $H_{RR}$, respectively, and the vehicle body is subject to a forward inclination $\alpha$. This case is defined as the vehicle in actual running condition.

Usually, the forward inclination $\alpha$ is a small angle. Since the protuberance detection distance $L_O$ of the preview sensor 33 obtained when the vehicle body 7 is in the predetermined attitude is longer than the then above-the-road height $H_{SO}$ of the sensor 33, however, the difference between the distance $L_O$ and a protuberance detection distance L of the preview sensor 33 obtained when the vehicle is in actual running condition (shown in FIG. 7) is not negligible. Accordingly, the operation of the selector valve 22, which will be mentioned later, cannot be executed with desired timing.

Figure 9:
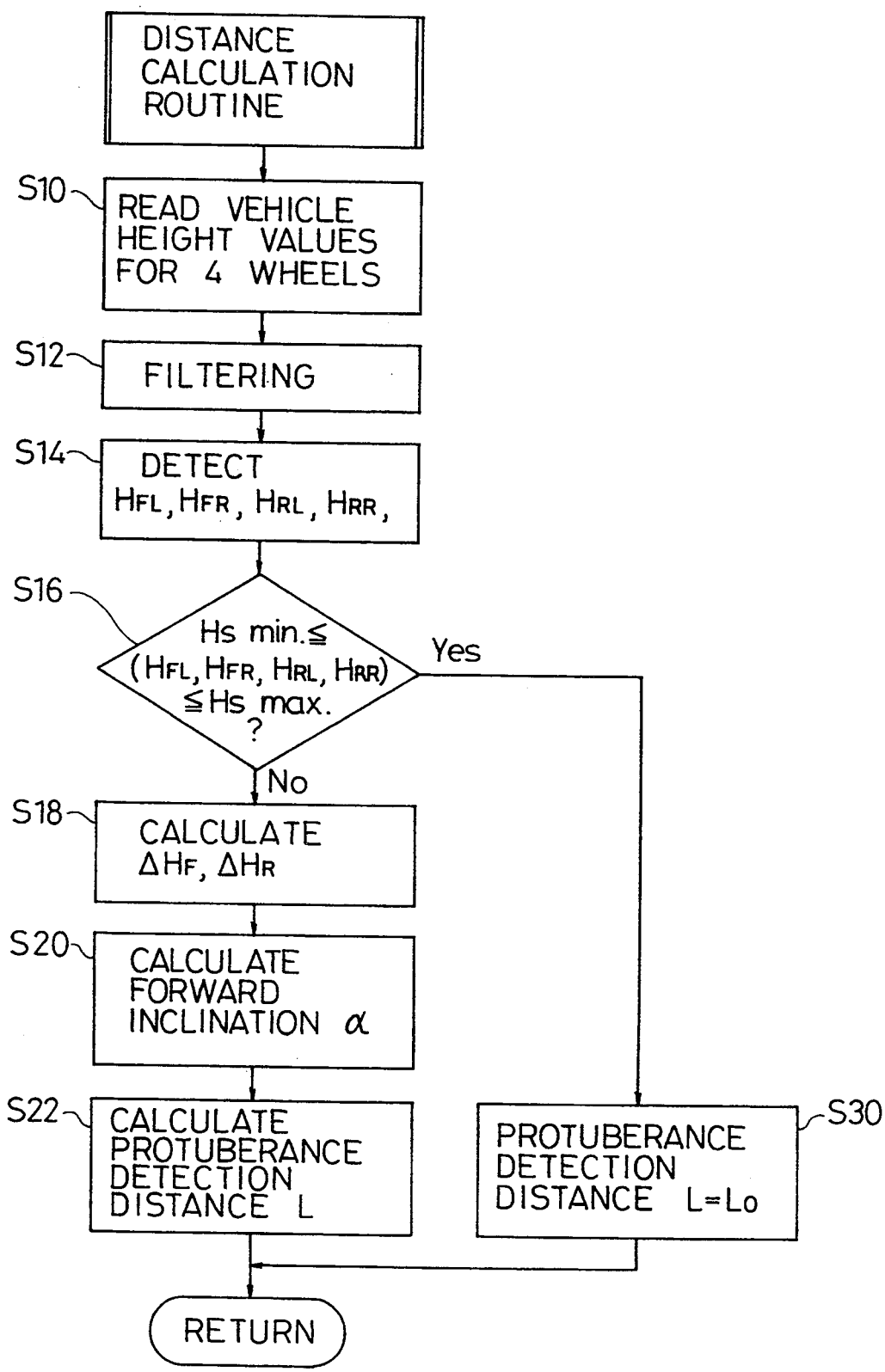
FIG. 9 is a flow chart showing a distance calculation routine executed by a controller.

If the vehicle body 7 is subject to the forward inclination $\alpha$, therefore, the predetermined protuberance detection distance $L_O$ of the preview sensor 33 obtained when the vehicle body is in the predetermined attitude should be corrected by executing a distance calculation routine shown in FIG. 9.

By introducing a negative version of the forward inclination $\alpha$, the distance calculation routine is also applicable to a case where the vehicle body 7 is subject to a backward inclination $\alpha$, and then to the calculation of the protuberance detection distance L of the preview sensor 33 for the case where only the vehicle height at the location of each wheel is deviated from the predetermined vehicle height value $H_{SO}$, without any forward or backward inclination of the vehicle body 7 entailed.

In the distance calculation routine, the controller 30 first reads the value of the vehicle height at the location of each wheel detected by the vehicle height sensor 32 (Step S10).

In order to separate noise components, each read vehicle height value is filtered to smooth data (Step S12).

Then, the vehicle height values $H_{FL}$ and $H_{FR}$ at the left and right front wheel locations and the values $H_{RL}$ and $H_{RR}$ at the left and right rear wheel locations, which are to be used in the following calculations are detected individually according to the above smoothed vehicle height data (Step S14). A vehicle body attitude determined by these vehicle height values $H_{FL}$, $H_{FR}$, $H_{RL}$ and $H_{RR}$ is the actual running vehicle attitude shown in FIG. 7.

Subsequently, it is determined whether or not all the vehicle height values $H_{FL}$, $H_{FR}$, $H_{RL}$ and $H_{RR}$ at the individual wheel locations detected in Step S14 are not smaller than a predetermined lower limit value $H_{smin}$ and not larger than a predetermined upper limit value $H_{smax}$. (Step S16), where these limit values are related to the predetermined vehicle height value $H_{SO}$ as follows:

$$H_{smin.} < H_{SO} < H_{smax.} \tag{1}$$

If the result of decision of Step S16 is YES, it is concluded that the change of the vehicle body attitude is so small that the protuberance detection distance of the preview sensor 33 need not be corrected, and $L = L_O$ is obtained in Step S30. Here $L_O$ is the predetermined protuberance detection distance of the sensor 33 obtained when the vehicle body 7 is in the predetermined attitude.

Thereupon, the present routine ends, and the program is returned.

If the result of decision of Step S16 is NO, that is, if any of the vehicle height values $H_{FL}$, $H_{FR}$, $H_{RL}$ and $H_{RR}$ at the individual wheel locations is smaller than the predetermined lower limit value $H_{smin}$ or larger than the predetermined upper limit value $H_{smax}$, the difference $\Delta H_F$ between an average vehicle height value $H_F$ at the front wheel locations and the predetermined vehicle height value $H_{SO}$ and the difference $\Delta H_R$ between an average vehicle height value $H_R$ at the rear wheel locations and the predetermined vehicle height value $H_{SO}$ are calculated according to equations (2) and (3) as follows (Step S18):

$$\Delta H_F = H_F - H_{SO}, \tag{2}$$

where we have $H_F = (H_{FL} + H_{FR})/2$, and $$\Delta H_R = H_R - H_{SO}, \tag{3}$$

where we have $H_R = (H_{RL} + H_{RR})/2$.

Figure 5:
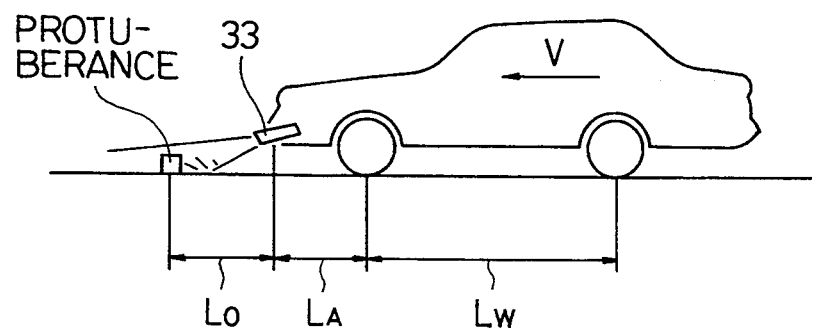
FIG. 5 is a schematic view illustrating the relationships between the position in which a preview sensor detects a protuberance and the respective positions of front and rear wheels.

Then, using $\Delta HF$ and $\Delta HR$ calculated in Step S18, the forward inclination $\alpha$ of the vehicle body is calculated according to equation (4) as follows (Step S20):

$$\alpha = \tan^{-1}\{(\Delta H_R - \Delta H_F)/L_W\}, \tag{4}$$

where $L_W$ is the distance between the front and rear wheels, that is, wheel base (see FIG. 5).

An above-the-road height $H_P$ of the preview sensor 33 for the time of actual running is calculated according to equation (5) as follows (see FIG. 8):

$$H_P = (H_{PO} - L_A \cdot \tan \alpha - \Delta H_F)\cos\alpha, \tag{5}$$

where $H_{PO}$ is the above-the-road height of the preview sensor 33 obtained when the vehicle body 7 is in the predetermined attitude (see FIG. 6), $L_A$ is the axial distance in the body 7 between the sensor 33 and front wheels 8 (see FIG. 5), $\alpha$ is the forward inclination of the vehicle body 7 calculated according to equation (4), and $\Delta H_F$ is the average front-wheel vehicle height value calculated according to equation (2).

Since the inclination $\alpha$ is a small angle, equation (5) can be rearranged as follows:

$$H_P = H_{PO} - \Delta H_F. \tag{6}$$

On the other hand, the protuberance detection distance L of the preview sensor 33 in actual running condition is calculated according to equation (7) as follows (see FIG. 7):

$$L = H_P/\tan\theta. \tag{7}$$

Here $H_{PO}$ and $\theta$ are the above-the-road height of the preview sensor 33 and the incidence angle, respectively, in actual running condition. Since $\theta$ is calculated according to equation (8), equation (7) can be replaced with equation (9) by substituting equations (6) and (8) into equation (7) (Step S22).

$$\theta = \theta_O' \alpha, \tag{8}$$

$$L = (H_{PO} - \Delta H_F)/\tan(\theta_O + \alpha). \tag{9}$$

Here $H_{PO}$ is the above-the-road height of the preview sensor 33 obtained when the vehicle body 7 is in the predetermined attitude (see FIG. 6), $\Delta H_F$ is the average front-wheel vehicle height value calculated according to equation (2), $\theta_O$ is the incidence angle of the preview sensor 33 obtained when the vehicle body 7 is in the predetermined attitude (see FIG. 6), and $\alpha$ is the forward inclination of the vehicle body 7 calculated according to equation (4).

In this manner, the protuberance detection distance L of the preview sensor 33 in actual running condition is calculated on the basis of the vehicle height value at each wheel location detected by the vehicle height sensor 32.

In the embodiment described above, the vehicle height sensor 32 is provided for the position of each wheel to calculate the protuberance detection distance L. Alternatively, however, the distance L may be calculated by using a vehicle body inclination sensor 35 (indicated by broken line in FIG. 1) for directly or indirectly detecting the forward inclination $\alpha$ of the vehicle body 7 or the incidence angle $\theta$, in actual running condition, and the vehicle height sensor 32 for directly or indirectly detecting the above-the-road height $H_P$ of the preview sensor 33 in actual running condition. In this case, the sensors 35 and 32 constitute the vehicle attitude sensing means.

Figure 10:
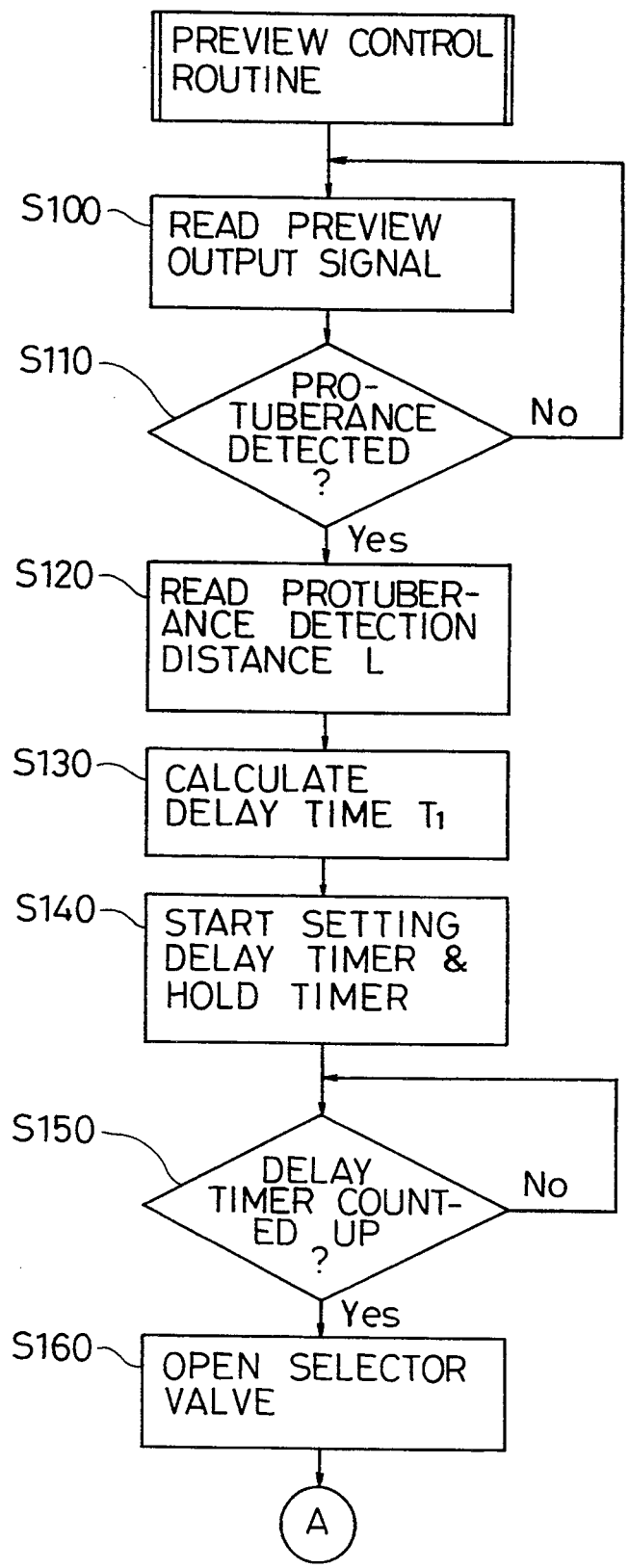
FIGS. 10 and 11 are flow charts showing a preview control routine executed by the controller.
Figure 11:
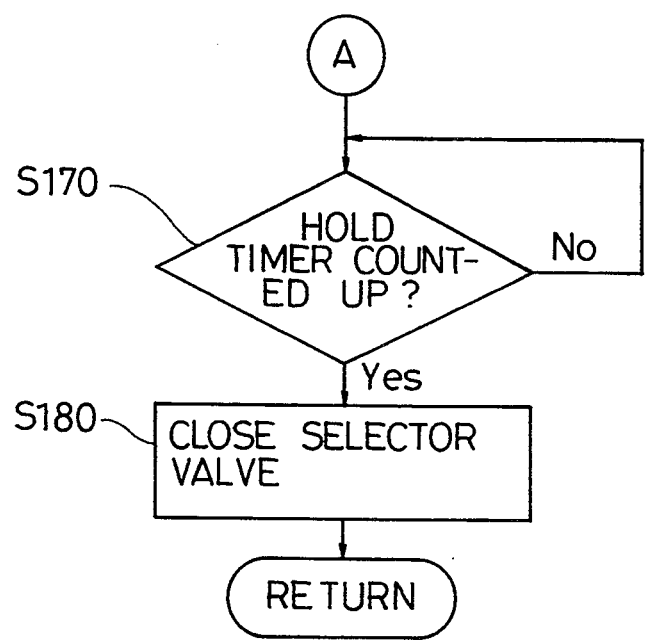
Figure 12:
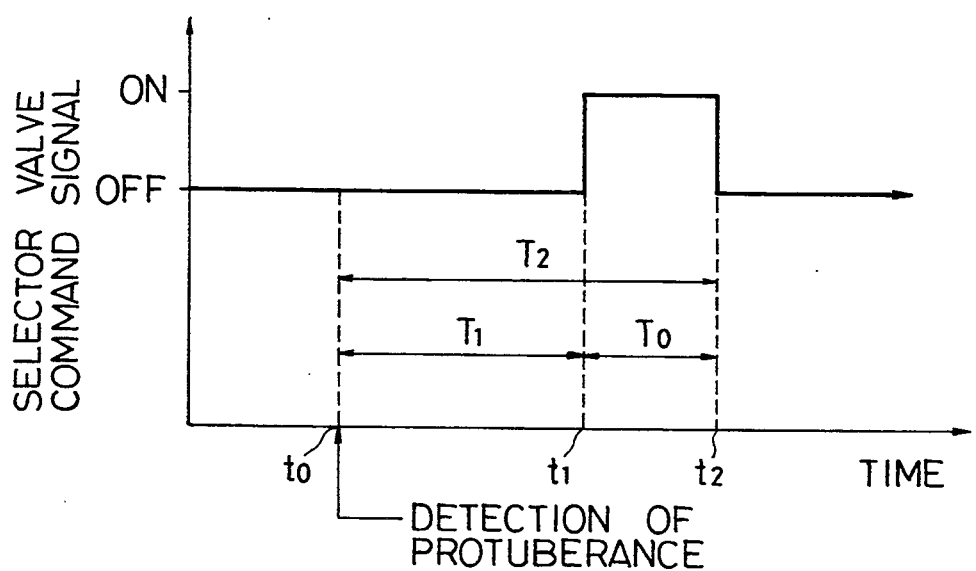
FIG. 12 is a graph illustrating the timing-for the generation of a command signal delivered from a controller to a selector valve.

Referring now to FIGS. 10 and 11, a preview control routine executed by the controller 30 will be described.

First, the controller 30 monitors and reads output signals from the preview sensor 33 (Step S100).

Then, based on the output signal from the preview sensor 33, it is determined whether or not there is an output signal indicative of a detection of an irregularity, e.g., a protuberance, on the road surface (Step S110).

If the result of decision of Step S110 is NO, Step S100 is executed again without the execution of the following steps.

If the result of decision of Step S110 is YES, the protuberance detection distance L, calculated and corrected in Step S22 or S30 of the distance calculation routine, is read (Step S120).

Then, a delay time $T_1$ is calculated by using the distance L read in Step S120 (Step S130). The time $T_1$ indicates a time interval between the point of time (shown as time point $t_O$ in FIG. 12) when the irregularity of the road surface is detected and the arrival of the wheel 8 at the irregularity. This delay time $T_1$ is calculated according to equation (10) or (11) as follows. In the present embodiment, the selector valve 22 is opened when the delay time $T_1$ has elapsed (shown as time point $t_1$ in FIG. 12), as mentioned later.

$$T_1 = (L + L_A)/V, \tag{10}$$

$$T_1 = (L + L_A L_W)/V. \tag{11}$$

Equation (10) is used to obtain the delay time for the front wheels, and equation (11) is for the rear wheels. $L_A$ is the axial distance in the body 7 between the sensor 33 and front wheels 8, $L_W$ is the wheel base, and V is the vehicle speed detected by the vehicle speed sensor 34 (see FIG. 5).

Then, the program proceeds to Step S140, whereupon a delay timer and a hold timer are set at the timer value $T_1$ and a value $T_2$ (mentioned later), respectively, and are started.

The delay timer, which is used to count the delay time $T_1$ set in Step S130, is provided for each of the front and rear wheels. The hold timer is also provided for each of the front and rear wheels. The timer value $T_2$ set in the hold timer indicates the time interval between the point of time (shown as time point $t_O$ in FIG. 12) when the protuberance is detected and the timing (shown as time point $t_2$ in FIG. 12) for opening the selector valve 22 after the protuberance is cleared by the wheel. The value $T_2$ is calculated according to equation (12) as follows:

$$T_2 = T_1 + T_O, \tag{12}$$

where $T_O$ is a predetermined hold time during which the selector valve 22 is kept open, and is set at, e.g.. 0.1 sec. $T_1$ is the delay time calculated according to equation (10) or (11).

The delay timer and the hold timer are up-counters which deliver an on-signal when they count up to each set timer value.

Then, the program proceeds to Step S150, whereupon it is determined whether or not the delay timer has counted up to the set timer value $T_1$.

If the result of decision of Step S150 is NO, the process of Step S150 is repeated so that the delay timer finishes counting up.

If the result of decision of Step S150 is YES, the controller 30 delivers a command signal for energizing the selector valve 22, whereupon the valve 22 is opened (Step S160). As a result, the second accumulator 21 communicates with the oil passage 16 by means of the valve 22.

Since the second branch passage 16b, unlike the first branch passage 16a, is not provided with the orifice, the flow resistance of the hydraulic oil, on which the vibration damping force of the suspension 12 depends, is lowered close to the oil passage resistance of the selector valve 22. Accordingly, the vibration damping force of the suspension 12 is greatly reduced, that is, the damper rigidity is extremely lowered. Thus, an impulsive force which the wheel receives when it gets over the protuberance of the road surface can be fully absorbed and relieved. As the second accumulator 21, which, like the first accumulator 20, has the gas spring effect, is switched to an operating state, the spring rigidity of the suspension 12 is also extremely lowered. In other words, the spring constant is lowered, so that the natural frequency of the suspension 12 is reduced.

Thus, when the wheel gets over the protuberance of the road surface, the impulsive force thereon is fully absorbed and relieved, so that the vehicle can ensure a soft feeling or improved comfortableness to ride in.

Then, the program proceeds to Step S170, whereupon it is determined whether or not the hold timer has counted up to the set timer value $T_2$.

If the result of decision of Step S170 is NO, the process of Step S170 is repeated so that the hold timer finishes counting up.

If the result of decision of Step S170 is YES, the controller 30 delivers a command signal for deenergizing the selector valve 22, whereupon the valve 22 is closed (Step S180). Thereupon, the present routine ends, and the program is returned.

Before the preview sensor 33 detects another irregularity of the road surface, the selector valve 22 is closed in response to the command signal from the controller 30, and the spring rigidity and the damper rigidity of the suspension 12 are increased.

In the embodiment described above, the selector valve 22 is opened when the delay time $T_1$ has elapsed, that is, when the wheel 8 reaches the irregularity. Alternatively, however, the valve 22 may be opened before the wheel 8 reaches the irregularity.

The suspension control according to the present invention is not limited to the application to the active suspension apparatus described herein, and may be applied to vehicular suspension apparatuses of any other types in which the suspension supporting conditions are changed depending on the output signal from the preview sensor 33.

What is claimed is:

1. A vehicular suspension control apparatus for controlling a suspension, having at least one of spring rigidity and damper rigidity characteristics, which is provided between at least one wheel and a body of a vehicle, comprising:

suspension characteristic changing means for changing at least one of said spring rigidity and damper rigidity characteristics of said suspension;

a forward road surface sensor means attached to said vehicle body for detecting an irregularity of a road surface located in front of said vehicle body;

a vehicle speed sensor for detecting a vehicle speed;

control means, responsive to said vehicle speed sensor, for calculating a point in time when said wheel reaches the irregularity of the road surface, in accordance with said vehicle speed detected by said vehicle speed sensor, when the irregularity of the road surface is detected by said forward road surface sensor, and delivering a command signal, for lowering at least one of said spring rigidity and said damper rigidity characteristics of said suspension, to said suspension characteristic changing means not later than said calculated point in time; and vehicle body attitude sensing means for detecting a vehicle height and an inclination of said vehicle body;

said control means, responsive to said attitude sensing means, for correcting said point in time in accordance with said detected vehicle height and inclination of said vehicle body, and said vehicle speed detected by said vehicle speed sensor.

2. A suspension control apparatus according to claim 1, wherein said forward road surface sensor means detects irregularities located a predetermined distance in front of said vehicle body when said vehicle body is at a predetermined height and a predetermined inclination, said predetermined height and said predetermined inclination referred to jointly as a predetermined attitude; and said control means corrects said predetermined distance in accordance with a variation of said detected vehicle height and said detected vehicle body inclination from said predetermined attitude, and calculates said point in time in accordance with said corrected predetermined distance and said vehicle speed detected by said vehicle speed sensor.

3. A suspension control apparatus according to claim 2, wherein said vehicle includes front and rear wheels; and said vehicle body attitude sensing means includes vehicle height sensing means for detecting vehicle heights at least at the respective locations of said front and rear wheels.

4. A suspension control apparatus according to claim 3, wherein said control means executes a first process for calculating an above-the-surface height and an incidence angle of said forward road surface sensor in accordance with vehicle heights detected by said vehicle height sensing means, a second process for correcting said predetermined distance in accordance with the above-the-surface height and the incidence angle calculated in said first process, a third process for calculating said point in time in accordance with the vehicle speed detected by said vehicle speed sensor and said predetermined distance corrected in said second process, when said irregularity of the road surface is detected by said forward road surface sensor, and a fourth process for delivering said command signal to said suspension characteristic changing means for a predetermined period of time after the passage of said point in time for lowering the rigidity of the suspension.

5. A suspension control apparatus according to claim 3, wherein said control means corrects said predetermined distance by calculating an above-the-road height and an incidence angle of the forward road surface sensor in accordance with the vehicle heights detected by the vehicle height sensing means.

6. A suspension control apparatus according to claim 5, wherein said control means calculates a vehicle height variation $\Delta H_F$ at each of said front wheels compared with a vehicle height at the front wheel location obtained when said vehicle body is in said predetermined attitude, in accordance with said vehicle heights at said front wheel location detected by said vehicle height sensing means, and calculates said above-the-road height $H_P$ of said forward road surface sensor according to an operational expression $H_P = H_{PO} - \Delta H_F$, based on said calculated vehicle height variation $\Delta H_F$ at said front wheel location and an above-the-road height $H_{PO}$ of said forward road surface sensor obtained when said vehicle body is in said predetermined attitude.

7. A suspension control apparatus according to claim 5, wherein said control means calculates vehicle height variations $\Delta H_F$ and $\Delta H_R$ at the respective locations of said front and rear wheels compared with vehicle heights at said front and rear wheel locations obtained when said vehicle body is in said predetermined attitude, in accordance with said vehicle heights at said front and rear wheel locations detected by said vehicle height sensing means, and calculates said incidence angle $\theta$ of said forward road surface sensor according to an operational expression $\theta = \theta_O + \tan^{-1}\{(\Delta H_R - \Delta H_F)/L_W\}$, based on said calculated vehicle height variations $\Delta H_F$ and $\Delta H_R$ at said front and rear wheel locations, a wheel base $L_W$ of said vehicle, and an incidence angle $\theta_O$ of said forward road surface sensor obtained when said vehicle body is in said predetermined attitude.

8. A suspension control apparatus according to claim 5, wherein said control means corrects said predetermined distance according to an operational expression $L = H_p/\tan \theta$ where L represents said predetermined distance, $H_p$ represents said above-the-road height and $\theta$ represents the incidence angle of said forward road surface sensor.

9. A suspension control apparatus according to claim 1, wherein said control means delivers the command signal for lowering at least one of said spring rigidity and said damper rigidity of the suspension to the suspension characteristic changing means for a predetermined period of time after the point of time when said command signal is delivered.

10. A suspension control apparatus according to claim 1, wherein said forward road surface sensor comprises a sensor utilizing ultrasonic waves.

11. A suspension control apparatus according to claim 1, wherein said suspension includes hydraulic actuator means for providing an adjustable supporting force to support said vehicle body on said wheel, an accumulator connected to said hydraulic actuator means for supplying oil thereto, and an oil passage connecting said hydraulic actuator means with the accumulator; and said suspension characteristic changing means includes a variable selector valve arranged in said oil passage, for variably controlling the flow of oil in said passage.

12. A suspension control apparatus according to claim 1, wherein said suspension includes hydraulic actuator means for providing an adjustable supporting force to support said vehicle body on said wheel, an accumulator connected to said hydraulic actuator means for supplying oil thereto, and an oil passage interconnecting said hydraulic actuator means and said accumulator; and said suspension characteristic changing means includes an orifice and a selector valve which can be selectively opened and closed, said orifice and said selector valve being arranged in parallel to each other in said oil passage to control the flow of oil therein.

13. A suspension control apparatus according to claim 1, wherein said suspension includes hydraulic actuator means for providing an adjustable supporting force to support said vehicle body on said wheel, first and second accumulators connected in parallel with each other and to the hydraulic actuator means for supplying oil thereto, and first and second oil passages connecting said hydraulic actuator means with said first and second accumulators, respectively;

said suspension characteristic changing means including a selector valve for selectively opening and closing the second oil passage to control the flow of oil to said hydraulic actuator means.

14. A suspension control apparatus according to claim 13, further comprising an orifice arranged in said first oil passage.

15. A vehicular suspension control apparatus for controlling a suspension having at least one of spring rigidity and damper rigidity characteristics, which is provided between at least one wheel and a body of a vehicle, comprising:

suspension characteristic changing means for changing at least one of said spring rigidity and damper rigidity characteristics of said suspension;

a forward road surface sensor means attached to said vehicle body for detecting an irregularity of a road surface located in front of said vehicle body at a predetermined distance from said sensor when said vehicle body is at a predetermined height and a predetermined inclination, said predetermined height and said predetermined inclination jointly referred to as a predetermined attitude;

a vehicle speed sensor for detecting a vehicle speed;

control means, responsive to said vehicle speed sensor, for calculating a point in time when said wheel reaches the irregularity of the road surface, in accordance with said vehicle speed detected by said vehicle speed sensor, when the irregularity of the road sensor is detected by said forward road surface sensor, and delivering a command signal, for lowering at least one of said spring rigidity and said damper rigidity characteristics of said suspension, to said suspension characteristic changing means not later than said calculated point in time; and vehicle body attitude sensing means for detecting a vehicle height and an inclination of said vehicle body;

wherein said control means corrects said predetermined distance in accordance with a variation of said detected vehicle height and said detected vehicle body inclination from said predetermined attitude, and calculates said point in time in accordance with said corrected predetermined distance and said vehicle speed detected by said vehicle speed sensor;

wherein said vehicle includes front and rear wheels;

wherein said vehicle body attitude sensing means includes vehicle height sensing means for detecting vehicle heights at least at the respective locations of said front and rear wheels; and wherein said control means executes said correction of said predetermined distance when any of said vehicle heights detected by said vehicle height sensing means deviates from a range defined by predetermined upper and lower limit values.

16. A suspension control apparatus according to claim 15, wherein said wheels include front-left, front-right, rear-left, and rear-right wheels;

said vehicle height sensing means is provided for each location of said wheels, and said control means executes said correction of said predetermined distance when at least one of said vehicle heights detected individually by said vehicle height sensing means deviates from said range defined by said predetermined upper and lower limit values.

17. A method of controlling a vehicular suspension having spring rigidity and damper rigidity characteristics, which is provided between at least one wheel and a body of vehicle, and which extensibly and retractably supports said vehicle body on said wheel, the method comprising the steps of:
- (a) detecting an irregularity of a road surface located in front of said vehicle body using a forward road surface sensor;
- (b) detecting a vehicle speed;
- (c) calculating a point in time when said wheel reaches the irregularity of the road surface in accordance with said detected vehicle speed when the irregularity of the road surface is detected;
- (d) detecting a vehicle height and an inclination of said vehicle body;
- (e) correcting said point in time in accordance with said detected vehicle height and inclination of said vehicle body, and said detected vehicle speed;
- (f) delivering a command signal, for lowering at least one of said spring rigidity and said damper rigidity characteristics of said suspension, to a suspension characteristic changing means not later than said calculated point in time;
- (g) changing at least one of said spring rigidity and damper rigidity characteristics of said suspension using said suspension characteristics changing means based on said command signal.

18. A method according to claim 17, wherein said step (f) delivers said command signal for lowering at least one of said spring rigidity and said damper rigidity of said suspension to said suspension characteristic changing means for a predetermined period of time after said point of time when said command signal is delivered.

19. A method according to claim 17, wherein said step (a) detects irregularities located a predetermined distance in front of said vehicle body when said vehicle body is at a predetermined height and a predetermined inclination, said predetermined height and said predetermined inclination referred to jointly as a predetermined attitude; and
said step (e) includes the steps of,
- (e1) correcting said predetermined distance in accordance with a variation of said detected vehicle height and said detected vehicle body inclination from said predetermined attitude, and
- (e2) correcting said point in time in accordance with said corrected predetermined distance and said vehicle speed detected by said vehicle speed sensor.

20. A method according to claim 19, wherein said vehicle includes front and rear wheels; and
said step (d) includes detecting vehicle heights at least at the respective locations of said front and rear wheels.

21. A method according to claim 20, wherein said step (e1) corrects said predetermined distance when any of said detected vehicle heights deviates from a range defined by predetermined upper and lower limit values.

22. A method according to claim 21, wherein
said step (d) detects a vehicle height at each location of four wheels, front-left, front-right, rear-left, and rear-right; and
said step (e1) corrects said predetermined distance when at least one of said detected vehicle heights deviates from said range defined by said predetermined upper and lower limit values.

23. A method according to claim 20, wherein said step (e1) corrects said predetermined distance by calculating an above-the-road height and an incidence angle of said forward road surface sensor in accordance with said detected vehicle heights.

24. A method according to claim 23, wherein said step (e1) includes the steps of:
- (e11) calculating a vehicle height variation $\Delta H_F$ at each of said front wheels compared with a vehicle height at said front wheel location obtained when said vehicle body is in said predetermined attitude in accordance with said detected vehicle heights at said front wheels; and
- (e12) calculating said above-the-road height $H_P$ of said forward road sensor according to an operational expression $H_P = H_{PO} - \Delta H_F$, based on said calculating vehicle height variation $\Delta H_F$ at said front wheel location and an above-the-road height $H_{PO}$ of said forward road surface sensor obtained when said vehicle body is in said predetermined attitude.

25. A method according to claim 23, wherein said step (e1) includes the steps of:
- (e11) calculating vehicle height variations $\Delta H_F$ and $\Delta H_R$ at the respective locations of said front and rear wheels compared with vehicle heights at said front and rear wheel locations obtained when said vehicle body is in said predetermined attitude, in accordance with said detected vehicle heights at said front and rear wheels; and
- (e12) calculating said incidence angle $\theta$ of said forward road surface sensor according to an operational expression $\theta = \theta_0 + \tan^{-1}\{(\Delta H_R - \Delta H_F)/L_W\}$, based on said calculated vehicle height variations $\Delta H_F$ and $\Delta H_R$ at said front and rear wheel locations, a wheel base $L_W$ of said vehicle, and an incidence angle $\theta_0$ of said forward road surface sensor obtained when said vehicle body is in said predetermined attitude.

26. A method according to claim 23, wherein said step (e1) corrects said predetermined distance according to an operational expression $L = H_p/\tan \theta$ where L represents said predetermined distance, $H_p$ represents said above-the-road height and $\theta$ represents said incidence angle of said forward road surface sensor.

* * * * *